United States Patent
Call

(10) Patent No.: US 8,887,968 B1
(45) Date of Patent: Nov. 18, 2014

(54) POUR SPOUT FOR MASON JAR

(76) Inventor: Brian Call, North Wilkesboro, NC (US)

(*) Notice: Subject to any disclaimer, the term of this patent is extended or adjusted under 35 U.S.C. 154(b) by 154 days.

(21) Appl. No.: 13/245,091

(22) Filed: Sep. 26, 2011

(51) Int. Cl.
| | |
|---|---|
| *B65D 5/72* | (2006.01) |
| *B67D 3/00* | (2006.01) |
| *A61J 9/00* | (2006.01) |
| *B21D 39/03* | (2006.01) |

(52) U.S. Cl.
USPC ........ 222/568; 222/481.5; 222/484; 222/477; 215/11.1; 29/428; 29/801

(58) Field of Classification Search
USPC ......... 222/481, 482, 483, 484, 569, 568, 478, 222/157, 158, 481.5, 566, 567, 477, 523, 222/525, 527, 528, 531, 479; 220/710, 796, 220/797; 215/11.5, 11.1; 29/428, 801
See application file for complete search history.

(56) References Cited

U.S. PATENT DOCUMENTS

| | | | | |
|---|---|---|---|---|
| 1,494,043 A | * | 5/1924 | Vogt ............................. | 222/484 |
| 1,626,050 A | * | 4/1927 | Pratt ............................. | 222/481 |
| 2,445,130 A | * | 7/1948 | Turner .......................... | 141/290 |
| 2,873,050 A | * | 2/1959 | Halverson ..................... | 222/158 |
| 3,104,039 A | * | 9/1963 | Dike ............................. | 222/536 |
| 3,105,619 A | * | 10/1963 | Rohrmuller ................... | 222/209 |
| 5,044,521 A | | 9/1991 | Peckels ......................... | 222/23 |
| 5,234,117 A | * | 8/1993 | Garvin ......................... | 215/11.4 |
| 6,050,445 A | * | 4/2000 | Manganiello ................. | 220/714 |
| RE37,016 E | * | 1/2001 | Morano ........................ | 220/714 |

OTHER PUBLICATIONS

BarSupplies.com information from the internet; copyright 2005-2011, 3 pgs.
Drinker.com information from the internet; copyright 2008, 4 pgs.

* cited by examiner

*Primary Examiner* — Kevin P Shaver
*Assistant Examiner* — Stephanie E Williams
(74) *Attorney, Agent, or Firm* — MacCord Mason PLLC

(57) ABSTRACT

An apparatus for capping a jar includes a plastic flat plate having a top and a bottom and a depending skirt with internal threadings and a hole in the flat plate. A measured liquor pouring spout inserted through the hole in the plate has a channel for flow of liquid and a cap sized and shaped to cover a liquor bottle with a lower skirt that abuts the top of the flat plate. The spout has a lower stem with a first radial flange under the cap abutting the top of the flat plate and a second radial flange under the cap spaced below the first radial flange. A gasket on the lower stem below the flat plate closes portions of the hole that surround the lower stem and secures the stem in position by fitting between the second radial flange and the bottom of the flat plate.

13 Claims, 6 Drawing Sheets

-- PRIOR ART --

POUR SPOUT FOR MASON JAR

BACKGROUND OF THE INVENTION

The present invention relates to a new capping mechanism for jars for dispensing liquids from the jar. The jars in particular are colloquially called mason jars, but other jars that are not considered to be mason jars are also within the scope of the invention.

It is well known in the bar and restaurant business to remove the standard screw caps from bottles of liquor and replace them with a pour spout that very often is a metering pour spout. This type of cap on the bottle allows the contents of the bottle to be maintained pure by preventing the ingress of contaminants, but also allows for easy dispensing when a customer asks for a drink to be mixed. Such dispensing spouts are very well known and are available from a number of vendors such as Winware (based in China), drinker.com and barsupplies.com. The dispensers are available in a number of different configurations including an unlimited pouring capability, so that the liquor continues to pour out of the spout as long as the bottle is tilted. Others provide a measured dispensation, stopping the flow after the premeasured amount flows. For example, barsupplies.com provides premeasured amounts of ¾ ounce, 1 ounce, 1¼ ounce, 1½ ounce and 2 ounces. Spouts like these are used in connection with this invention.

However, there has become popular a new form of liquor emulating the well known moonshine liquor. The new liquor is sold legally in jars with large caps (i.e. mason jars) to maintain the customer's impression of moonshine. Bars selling this sort of liquor want to continue the "moonshine" theme by displaying the jar in its original packaging so that customers recognize that they are getting the genuine product. However, this poses a problem in dispensing from the jars, and particularly, in dispensing measured pours. Such mason jars are difficult to pour from without spillage, and do not provide for measured pours.

SUMMARY OF THE INVENTION

The present invention fulfills one or more of these needs in the art by providing an apparatus for capping a jar including a flat plate having a top and a bottom and a depending peripheral skirt with internal threadings on the internal skirt and a hole in the flat plate. A liquor pouring spout has a lower stem that is inserted through the hole in the flat plate. It also has a through-channel for flow of liquid mounted to a cap sized and shaped to cover a liquor bottle. The lower stem has a radial flange under the cap that abuts the top of the flat plate. A gasket on the lower stein below the flat plate closes portions of the hole that surround the lower stem.

The lower stein may have an additional radial flange under the cap so the gasket fits between the additional radial flange and the bottom of the flat plate. Preferably, the gasket is secured in position between the additional radial flange and the bottom of the flat plate.

The hole in the flat plate may be centered in the flat plate. In an embodiment, the hole is $^{65}/_{1000}$ inch in diameter.

Desirably, the flat plate and depending peripheral skirt are a unitary item of plastic.

The cap that is sized and shaped to cover a liquor bottle of the liquor pouring spout may have a lower skirt that abuts the top of the flat plate.

The lower stem of the liquor pouring spout may have two additional radial flanges under the cap of a diameter smaller than the diameter of the radial flange under the cap of the liquor pouring spout that abuts the top of the flat plate.

In some embodiments the liquor pouring spout is a measured pourer.

The invention can also be considered as a method of making a pour spout cap for a jar including providing a cap with a flat plate having a top and a bottom and a depending peripheral skirt with internal threadings on the internal skirt and cutting a hole in the flat plate and a liquor pouring spout having a through-channel for flow of liquid mounted to a cap sized and shaped to cover a liquor bottle with a lower skirt, the liquor pouring spout having a lower stem with at least two radial flanges. The method includes removing outer portions of any radial flanges below a topmost radial flange to make at least one reduced-diameter radial flange. The lower stem of the liquor pouring spout is then inserted through the hole in the flat plate until the cap abuts the top of the flat plate. Then the lower stem below the flat plate is surrounded with a gasket and the gasket is pushed along the lower stem until it abuts the bottom of the flat plate, thereby closing portions of the hole in the flat plate radially outward of the lower stem.

Surrounding the lower stem below the flat plate with a gasket and pushing the gasket along the lower stem until it abuts the bottom of the flat plate may thereby close portions of the hole in the flat plate radially outward of the lower stem and secure the liquor pouring spout in position affixed to the flat plate as the gasket fits between a reduced-diameter radial flange and the bottom of the flat plate.

Cutting a hole in the flat plate may include cutting a hole that is $^{65}/_{1000}$ inch in diameter.

In another embodiment the apparatus for capping a jar includes a flat plate having a top and a bottom and a depending peripheral skirt with internal threadings on the internal skirt. Two opposed holes are in the flat plate, each of which is adjacent an opposite side of the depending peripheral skirt, so that the apparatus can be affixed to a threaded top of a jar of a liquid. When the apparatus and jar are tilted, the liquid can flow from one of the holes, with air entering the other hole to fill space in the jar left empty by the flowing liquid.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
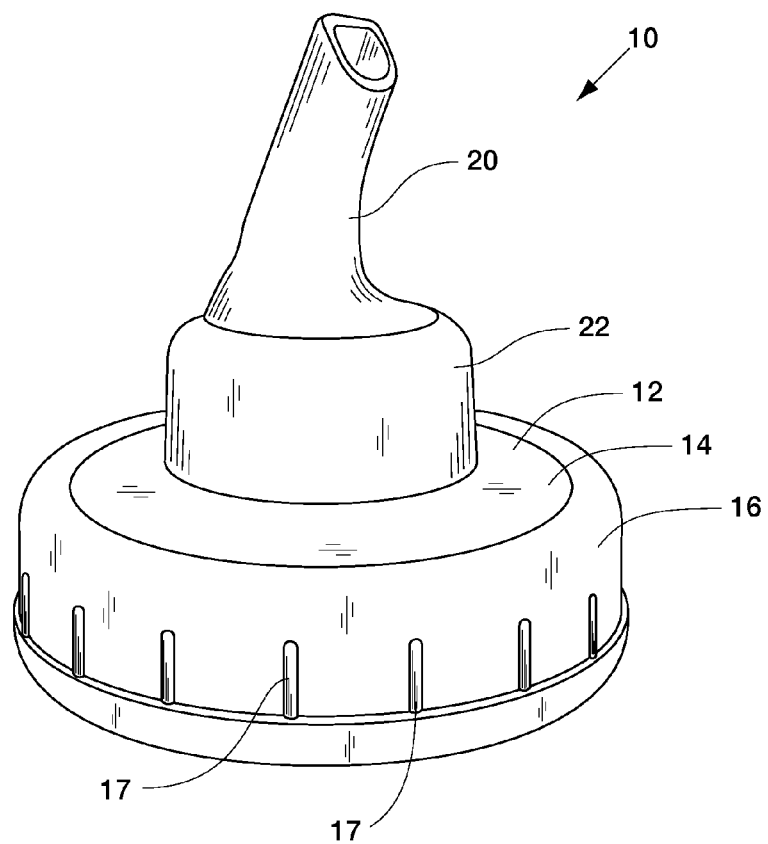
FIG. 1 is a top perspective view of an embodiment of the invention.
Figure 2:
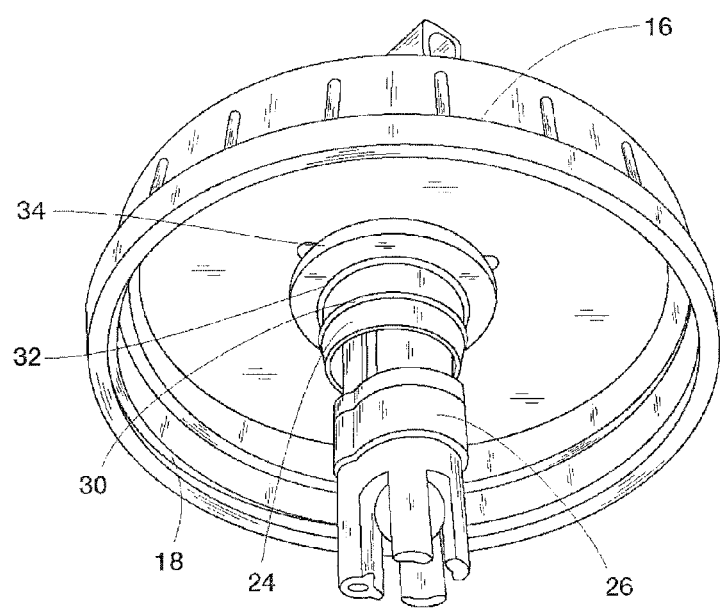
FIG. 2 is a bottom perspective view of the embodiment of FIG. 1.
Figure 3:
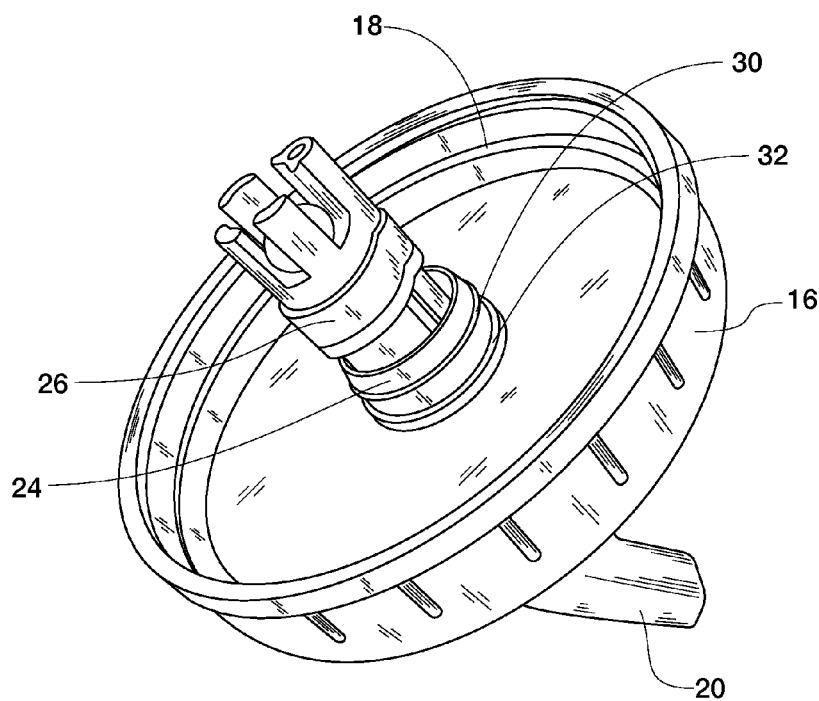
FIG. 3 is a bottom perspective view of the embodiment of FIG. 1 partially disassembled.

FIG. 1 shows a pour spout for a mason jar in accordance with an embodiment of the invention. The pour spout 10 includes a lid 12 sized to fit on the mason jar or other wide-mouth jar. The lid 12 has a flat plate 14 and a depending skirt 16. The skirt 16 has internal threads 18 as seen in FIGS. 2 and 3. The threads are configured to mate with the threads on the top of the jar, in conventional fashion. The cap also can be provided with vertical ridges 17 to enable easy turning of the cap to screw it on and off of the mason jar. The lid 12 is preferably made of plastic so it is not corroded by the contents of the jar. A hole (not seen) is drilled into the flat plate 14. In the embodiment shown in FIG. 1 the hole is drilled in the center of the plate 14, although it could also be closer to one edge of the plate 14, nearer a part of to the depending skirt 16. In a preferred embodiment, the hole is drilled to have a diameter of 65 one thousandths of an inch.

Figure 6:
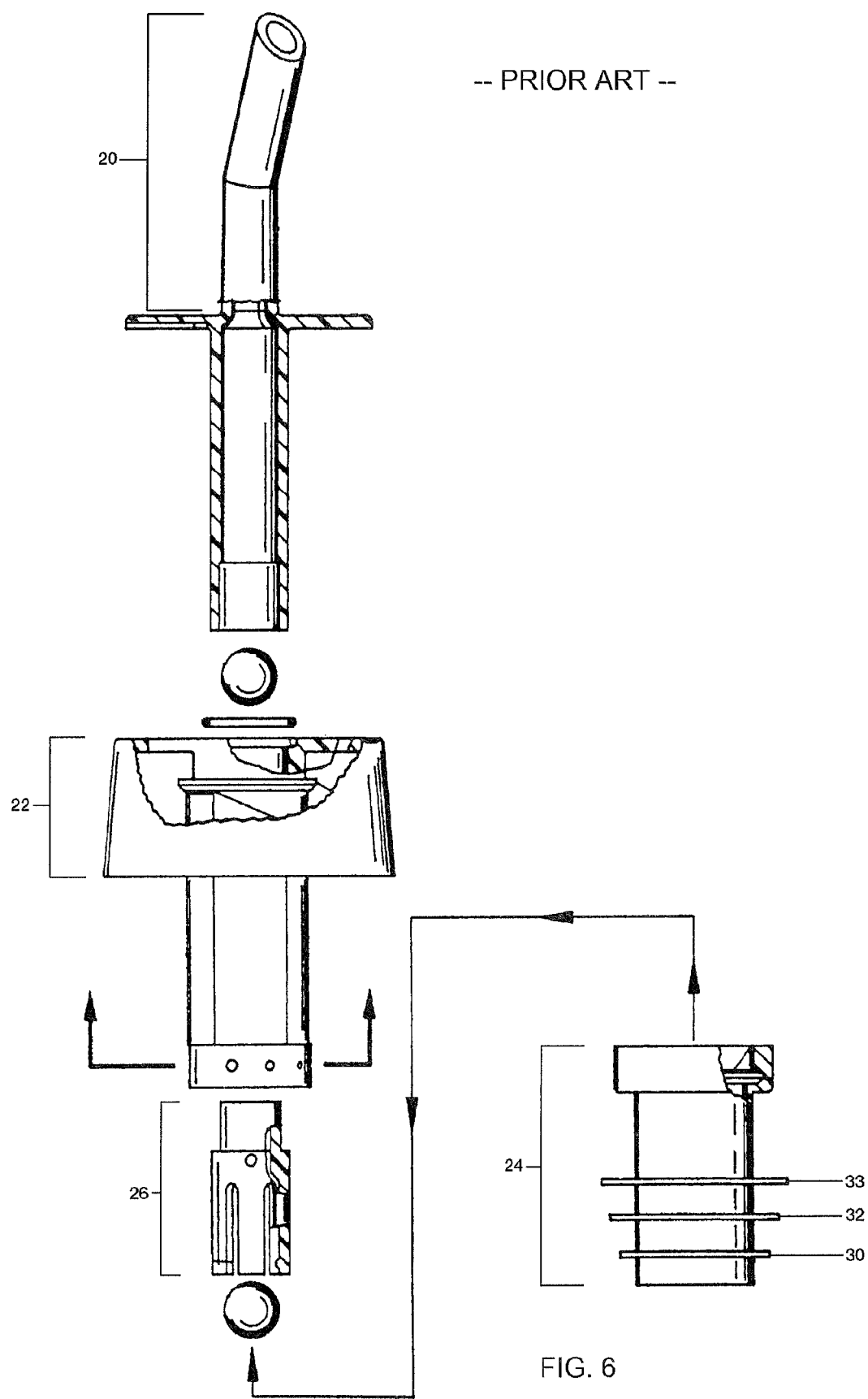
FIG. 6 is a an exploded view of the liquor pouring dispenser.

A conventional pouring spout 20 such as those discussed above is provided to be inserted through the hole made in the plate 14. The pouring spout 20 has a cap 22 which is normally used on liquor bottles to fit onto the outside of the top of the bottle. A lower stem 24 seen in FIGS. 2 and 3 extends below the cap 22 through the hole formed in the plate 14. Before such insertion, however, radial flanges 30 and 32 are cut down in size. The careful selection of 65 one thousandths of an inch diameter for the hole diameter allows a third flange, seen in FIG. 6, to abut the top of the flat plate 14, substantially closing the perimeter of the hole through which the lower stem 24 has been inserted. Then, a gasket 34 is placed around a lower stem 24, and pushed past the reduced diameter flanges 30 and 32 to snuggly engage the bottom of the flat plate 14. Conveniently, the gasket 34 can be a washer used in garden hoses. The gasket 34 is held in position by being wedged between the radial flange 32 and the bottom of the flat plate 14. FIG. 3 shows the same view, but without the gasket 34 in place. FIGS. 2 and 3 also show a component 26 of the lower stem of the conventional liquor pouring spout, which provides the channel for liquor to flow through the spout when the jar is tilted. As seen in the Figures, the pour spout 20 is a metering spout with ball valves that close when the predetermined volume has been dispensed. However, the invention also encompasses pouring spouts that do not have such restrictions.

The invention has been described with respect to liquor pouring spouts that have three radial flanges, but can be used with spouts having differing number of radial flanges. Also, spouts having differing lowering diameter stems can be accommodated by providing a hole in the flat plate of a size only slightly larger than the main diameter of the lower stem, but not larger than the outermost extent of the upper radial flanges of the lower stem. Radial flanges below the upper stem would similarly be subject to diameter reductions by cutting off the diameter necessary to allow the lower stem to pass through the hole formed in the flat plate.

It is believed that the volumetrally controlled drink dispenser described in U.S. Pat. No. 5,044,521 to Peckles shows a suitable pouring spout. The entire disclosure of that disclosure is incorporated herein by reference.

Figure 4:
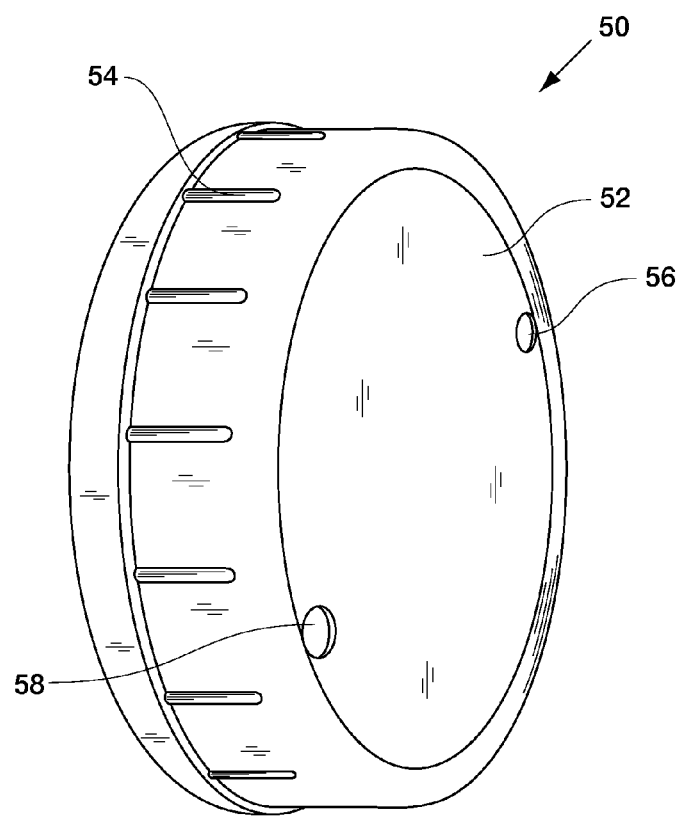
FIG. 4 is a top perspective view of another embodiment.
Figure 5:
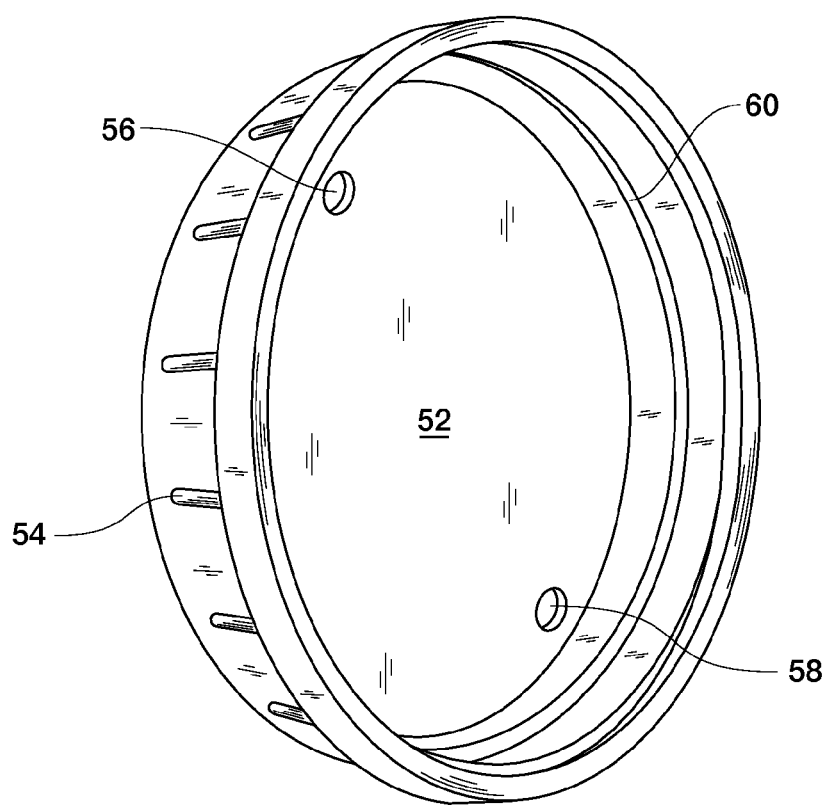
FIG. 5 is a bottom perspective view of the embodiment of FIG. 4.

FIG. 4 shows an alternate embodiment 50. In the embodiment 50, a cap of conventional design similar to the cap 12 of the first embodiment has a flat plate 52 and a depending peripheral skirt 54. The skirt 54 has internal threads 60 as seen in FIG. 5. Holes 56 and 58 are drilled in the flat plate 52 on opposed sides of the plate 52, within the skirt 54.

When the embodiment 50 is screwed onto a jar of liquid such as liquor, the jar can simply be tilted so that one of the holes 56 or 58 is at the bottom of the jar, and liquor will flow out of the lower hole. Air can then enter the upper hole to fill the space being vacated by the liquid, so that the liquid flows freely. Again, it is preferred that the cap of embodiment 50 be made of plastic to prevent corrosion by the liquor contents.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for capping a jar comprising
   a flat plate having a top and a bottom and a depending peripheral skirt with internal threadings on the internal skirt and a hole in the flat plate, wherein the flat plate and depending peripheral skirt are a unitary item of plastic,
   a measured liquor pouring spout inserted through the hole in the flat plate and having a through-channel for flow of liquid mounted to a cap sized and shaped to cover a liquor bottle that abuts the top of the flat plate, the liquor pouring spout having a lower stem with a first radial flange under the cap that abuts the top of the flat plate and a second radial flange under the cap spaced below the first radial flange, and
   a gasket on the lower stem below the flat plate and closing portions of the hole that surround the lower stem and secured in position by fitting between the second radial flange and the bottom of the flat plate.

2. A method of making a pour spout cap for a jar comprising,
   providing a lid with a flat plate having a top and a bottom and a depending peripheral skirt with internal threadings on the internal skirt
   cutting a hole in the flat plate,
   providing a liquor pouring spout having a through-channel for flow of liquid mounted to a cap sized and shaped to cover a liquor bottle, the liquor pouring spout having a lower stem with at least two radial flanges
   removing outer portions of any radial flanges below a topmost radial flange to make a reduced-diameter radial flange,
   inserting the lower stem of the liquor pouring spout through the hole in the flat plate until the cap abuts the top of the flat plate,
   surrounding the lower stem below the flat plate with a gasket and pushing the gasket along the lower stem until it abuts the bottom of the flat plate, thereby closing portions of the hole in the flat plate radially outward of the lower stem.

3. A method as claimed in claim 2 wherein surrounding the lower stem below the flat plate with a gasket and pushing the gasket along the lower stem until it abuts the bottom of the flat plate, thereby closing portions of the hole in the flat plate radially outward of the lower stem secures the liquor pouring spout in position affixed to the flat plate as the gasket fits between a reduced-diameter radial flange and the bottom of the flat plate.

4. A method as claimed in claim 2 wherein cutting a hole in the flat plate is cutting a hole that is $65/1000$ inch in diameter.

5. An apparatus for capping a jar comprising:
   a flat plate having a top and a bottom and a depending peripheral skirt with internal threadings on the internal skirt and a hole in the flat plate;
   a liquor pouring dispenser having
   a spout,
   a through-channel for flow of liquid,
   a cap sized and shaped to cover a liquor bottle,
   a lower stem having a radial flange under said cap and a length that enables pouring while the jar is tiled upside-down,
   wherein said spout is mounted to a said cap, said cap abuts the top of the flat plate, and said lower stem is inserted through the hole in the flat plate;

a gasket on the lower stem below the flat plate and closing portions of the hole that surround the lower stem.

6. An apparatus for capping a jar comprising a flat plate having a top and a bottom and a depending peripheral skirt with internal threadings on the internal skirt and a hole in the flat plate, a liquor pouring spout having a lower stem that is inserted through the hole in the flat plate and having a through-channel for flow of liquid mounted to a cap sized and shaped to cover a liquor bottle, the lower stem having a radial flange under the cap that abuts the top of the flat plate, wherein the lower stem has an additional radial flange under the cap and a gasket fits between the additional radial flange and the bottom of the flat plate, and wherein the gasket on the lower stem below the flat plate closes portions of the hole that surround the lower stem.

7. An apparatus as claimed in claim 6 wherein the gasket is secured in position between the additional radial flange and the bottom of the flat plate.

8. An apparatus as claimed in claim 6 wherein the hole in the flat plate is centered in the flat plate.

9. An apparatus as claimed in claim 6 wherein the flat plate and depending peripheral skirt are a unitary item of plastic.

10. An apparatus as claimed in claim 6 wherein the lower stem has two additional radial flanges under the cap of a diameter smaller than the diameter of the radial flange under the cap of the liquor pouring spout that abut the top of the flat plate.

11. An apparatus as claimed in claim 6 wherein the liquor pouring spout is a measured pourer.

12. An apparatus for capping a jar comprising a flat plate having a top and a bottom and a depending peripheral skirt with internal threadings on the internal skirt and a hole in the flat plate, a liquor pouring spout having a lower stem that is inserted through the hole in the flat plate and having a through-channel for flow of liquid mounted to a cap sized and shaped to cover a liquor bottle, the lower stem having a radial flange under the cap that abuts the top of the flat plate, wherein the cap sized and shaped to cover a liquor bottle of the liquor pouring spout has a lower skirt that abuts the top of the flat plate, and a gasket on the lower stem below the flat plate and closing portions of the hole that surround the lower stem.

13. An apparatus as claimed in claim 12 wherein the gasket is secured in position between the additional radial flange and the bottom of the flat plate.

\* \* \* \* \*

UNITED STATES PATENT AND TRADEMARK OFFICE
CERTIFICATE OF CORRECTION

PATENT NO. : 8,887,968 B1  
APPLICATION NO. : 13/245091  
DATED : November 18, 2014  
INVENTOR(S) : Brian N. Call Page 1 of 1

It is certified that error appears in the above-identified patent and that said Letters Patent is hereby corrected as shown below:

On the Title Page, Item (76) the inventor's name should read, Brian N. Call

In the Specification

In column 1, line 52, the word stein should be "stem"

In column 1, line 54, the word stein should be "stem"

Signed and Sealed this
Tenth Day of March, 2015

Michelle K. Lee
*Deputy Director of the United States Patent and Trademark Office*